United States Patent
Meredith et al.

(10) Patent No.: US 9,726,500 B2
(45) Date of Patent: Aug. 8, 2017

(54) METHOD AND SYSTEM FOR GENERATING SYNTHETIC LOCATION INFORMATION

(71) Applicant: AT&T Mobility II LLC, Atlanta, GA (US)

(72) Inventors: Sheldon Meredith, Marietta, GA (US); Mark Austin, Roswell, GA (US); Jeremy Fix, Acworth, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 131 days.

(21) Appl. No.: 14/074,903

(22) Filed: Nov. 8, 2013

(65) Prior Publication Data

US 2015/0134245 A1    May 14, 2015

(51) Int. Cl.
   *G01S 1/00*     (2006.01)
   *G01S 5/02*     (2010.01)
   *G01C 21/20*    (2006.01)

(52) U.S. Cl.
   CPC ..................... *G01C 21/20* (2013.01)

(58) Field of Classification Search
   CPC ..................................................... G01C 21/34
   USPC ........................................................ 701/491
   See application file for complete search history.

(56) References Cited

U.S. PATENT DOCUMENTS

| | | | |
|---|---|---|---|
| 7,912,630 B2 | 3/2011 | Alewine et al. | |
| 8,027,877 B2 | 9/2011 | Crolley | |
| 8,478,642 B2 | 7/2013 | Dey et al. | |
| 2009/0006194 A1 | 1/2009 | Sridharan et al. | |
| 2010/0088019 A1* | 4/2010 | Barcklay ............... | G01C 21/30 701/533 |
| 2010/0332339 A1 | 12/2010 | Patel et al. | |
| 2011/0184643 A1 | 7/2011 | Abhyanker | |
| 2011/0270618 A1 | 11/2011 | Banerjee et al. | |
| 2012/0215641 A1 | 8/2012 | Ohki | |
| 2012/0323692 A1 | 12/2012 | Shutter | |
| 2013/0013412 A1 | 1/2013 | Altman et al. | |
| 2013/0046636 A1 | 2/2013 | Asnake | |
| 2013/0066880 A1* | 3/2013 | Schramm ............... | G01C 21/32 707/743 |
| 2014/0107919 A1* | 4/2014 | Venkatraman .......... | G01S 19/48 701/466 |

* cited by examiner

*Primary Examiner* — Calvin Cheung
*Assistant Examiner* — Paula L Schneider
(74) *Attorney, Agent, or Firm* — Fay Kaplun & Marcin, LLP

(57) ABSTRACT

A method including receiving a first location for a mobile device at a first time; receiving a second location for the mobile device at a second time; determining a most likely route for the mobile device based on the first location, the second location, and a time interval between the first time and the second time; and generating a synthetic location for the mobile device based on the most likely route at a corresponding synthetic time between the first time and the second time.

17 Claims, 3 Drawing Sheets

US 9,726,500 B2

METHOD AND SYSTEM FOR GENERATING SYNTHETIC LOCATION INFORMATION

BACKGROUND

User location data is a valuable asset that may be generated by telecommunications providers or other entities as an outgrowth of the provision of services. This data may be valuable, for example, to advertisers who wish to target advertising to potential customers based on their proximity to the advertiser's premises. Typical conventional methods of determining user location data either require the use of impractical amounts of power from the battery of a mobile device, or generate user location data that is too inaccurate to be of significant value.

SUMMARY OF THE INVENTION

A method includes receiving a first location for a mobile device at a first time; receiving a second location for the mobile device at a second time; determining a most likely route for the mobile device based on the first location, the second location, and a time interval between the first time and the second time; and generating a synthetic location for the mobile device based on the most likely route at a corresponding synthetic time between the first time and the second time.

A system includes a first access point in a first location. The first access point communicates with a mobile device at a first time. The system also includes a second access point in a second location. The second access point communicates with the mobile device at the second time. The system also includes a server including a memory storing a set of instructions and a processor executing the set of instructions to perform operations including receiving a first locate from the first access point, the first locate corresponding to the first location and the first time; receiving a second locate from the second access point, the second locate corresponding to the second location and the second time; determining a most likely route for the mobile device based on the first location, the second location, and a time interval between the first time and the second time; and generating a synthetic locate for the mobile device based on the most likely route at a corresponding synthetic time between the first time and the second time.

A non-transitory computer-readable storage medium includes a set of instructions executable by a processor. The set of instructions, when executed by the processor, causes the processor to perform operations comprising receiving a first location for a mobile device at a first time; receiving a second location for the mobile device at a second time; determining a most likely route for the mobile device based on the first location, the second location, and a time interval between the first time and the second time; and generating a synthetic location for the mobile device based on the most likely route at a corresponding synthetic time between the first time and the second time.

DETAILED DESCRIPTION

Figure 1:
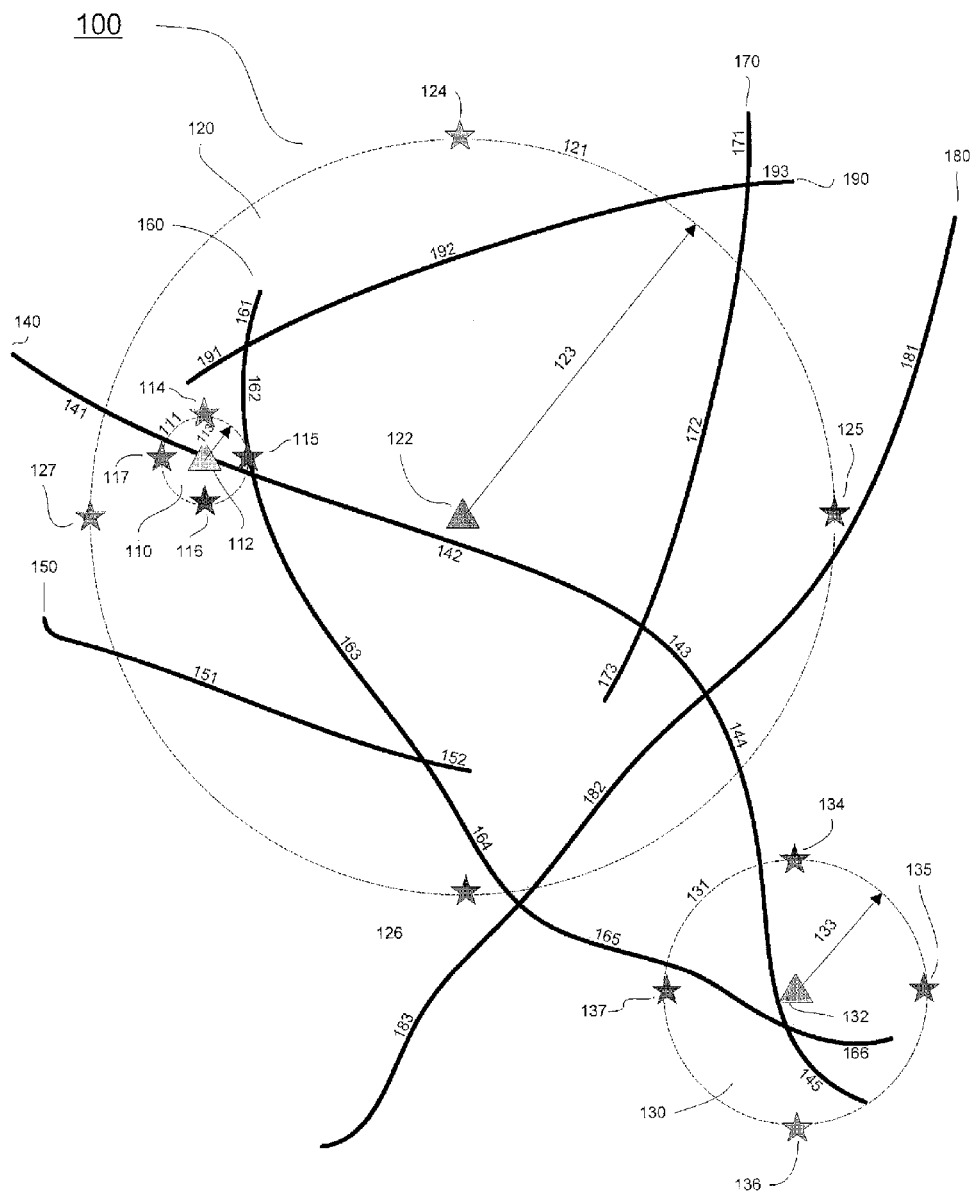
FIG. 1 shows an exemplary map of locations that may be used to generate synthetic location information according to an exemplary embodiment.

The exemplary embodiments may be further understood with reference to the following description and the related appended drawings, wherein like elements are provided with the same reference numerals. Specifically, the exemplary embodiments relate to methods and systems for generating accurate synthetic location data for mobile devices.

User location data is a valuable asset that may be generated by telecommunications providers or other entities as an outgrowth of the provision of services. This data may be valuable, for example, to advertisers who wish to target advertising to potential customers based on their proximity to the advertiser's premises. Throughout this disclosure, a "locate" will be used to refer to a single piece of location data comprising a user identifier, a location, and a time. The value of location data depends, among other factors, on the accuracy of the locations provided; that is, a locate that is accurate to within 200 meters is more valuable than a locate that is accurate to within 1,000 meters, and so on.

A modern mobile computing device, such as a smart phone, tablet, etc., may typically include a GPS receiver that is capable of determining a highly accurate location, such as to within 10 meters. However, the use of the GPS receiver to determine such locates at frequent time intervals will typically consume a significant amount of a device's stored battery power. It will be apparent to those of skill in the art that if a device's battery level is low, a user of the device may disable the device's GPS receiver to limit subsequent power use, thus preventing generation of further locates; obviously, if a device's battery is empty, it cannot generate any location data at all.

Conversely, radio locates, wherein a device's location is determined by the identity (and corresponding known location and other factors such as received signal strength indication or "RSSI") of a cell tower or other access point with which the device is communicating at a given time, do not present a significant strain on the device's battery life, as communicating with a cell tower or other access point is typically part of the device's core function. The accuracy of a radio locate may depend on the transmitting power of the cell tower or other access point, and may typically be, for example, between within 200 meters and within 500 meters. It will be apparent to those of skill in the art that radio locates are typically significantly less accurate than GPS locates and, commensurately, significantly less valuable.

The exemplary embodiments, which will be discussed in detail below, uses low-accuracy locates, such as radio locates, to generate high-accuracy synthetic locates along a path between radio locates. It will be apparent to those of skill in the art that, though the exemplary embodiments are described with specific reference to radio locates that are generated based on a mobile phone communicating with a cell tower, the broader principles are equally applicable to any other type of low-accuracy locate.

FIG. 1 illustrates a map 100 of an area in which high-accuracy locates are to be generated according to an exemplary embodiment. The map 100 includes a first locate 110 that may be captured at a first time. The first locate 110 may be a high-accuracy locate; for example, it may be a GPS locate, though this is only one example of a high-accuracy locate. Therefore, the first locate 110 may be accurate to within a small distance, i.e., the location of the device at the time of the first locate 110 is somewhere within a circle 111, centered at a center point 112 represented on map 100 by a triangle, having a radius 113. The radius 113 may be, for example, 100 meters. The map 100 also includes radial points 114, 115, 116 and 117, represented on map 100 by stars, evenly spaced along the circle 111. In the exemplary map 100, the radial points 114, 115, 116 and 117 are to the north, east, south, and west, respectively, of the center point 112, but it will be apparent to those of skill in the art that this orientation is only exemplary.

The map 100 includes a second locate 120 that may be captured at a second time. The second locate 120 may be a low-accuracy locate; for example, it may be a radio locate, though this is only one example of a low-accuracy locate. Therefore, the second locate 120 may be accurate to within a large distance, i.e., the location of the device at the time of the second locate 120 is somewhere within a circle 121, centered at a center point 122 represented on map 100 by a triangle, having a radius 123. The radius 123 may be, for example, 1,000 meters. The map 100 also includes radial points 124, 125, 126 and 127, represented on map 100 by stars, evenly spaced along the circle 121.

The map 100 includes a third locate 130 that may be captured at a third time. The third locate 130 may be a medium-accuracy locate; for example, it may also be a radio locate, but may be more accurate than the second locate 120 because it is a radio locate based on a lower-power transmitter. Therefore, the third locate 130 may be accurate to within a medium distance, i.e., the location of the device at the time of the third locate 130 is somewhere within a circle 131, centered at a center point 132 represented on map 100 by a triangle, having a radius 133. The radius 133 may be, for example, 500 meters. The map 100 also includes radial points 134, 135, 136 and 137, represented on map 100 by stars, evenly spaced along the circle 131.

The map 100 also includes roads 140, 150, 160, 170 and 180. The roads may further be broken up into segments. Road 140 may be broken up into segment 141 from its first endpoint to its first intersection with road 160, segment 142 from its first intersection with road 160 to its intersection with road 170, segment 143 from its intersection with road 170 to its intersection with road 180, segment 144 from its intersection with road 180 to its second intersection with road 160, and segment 145 from its second intersection with road 160 to its second endpoint. Road 160 may be broken up into segment 161 from its first endpoint to its first intersection with road 140, segment 162 from its first intersection with road 140 to its intersection with road 150, segment 163 from its intersection with road 150 to its intersection with road 180, segment 164 from its intersection with road 180 to its second intersection with road 140, and segment 165 from its second intersection with road 140 to its second endpoint. Road 170 may be broken up into segment 171 from its first endpoint to its intersection with road 140, and segment 172 from its intersection with road 140 to its second endpoint. Road 180 may be broken up into segment 181 from its first endpoint to its intersection with road 140, segment 182 from its intersection with road 140 to its intersection with road 160, and segment 183 from its intersection with road 160 to its second endpoint.

Figure 2:
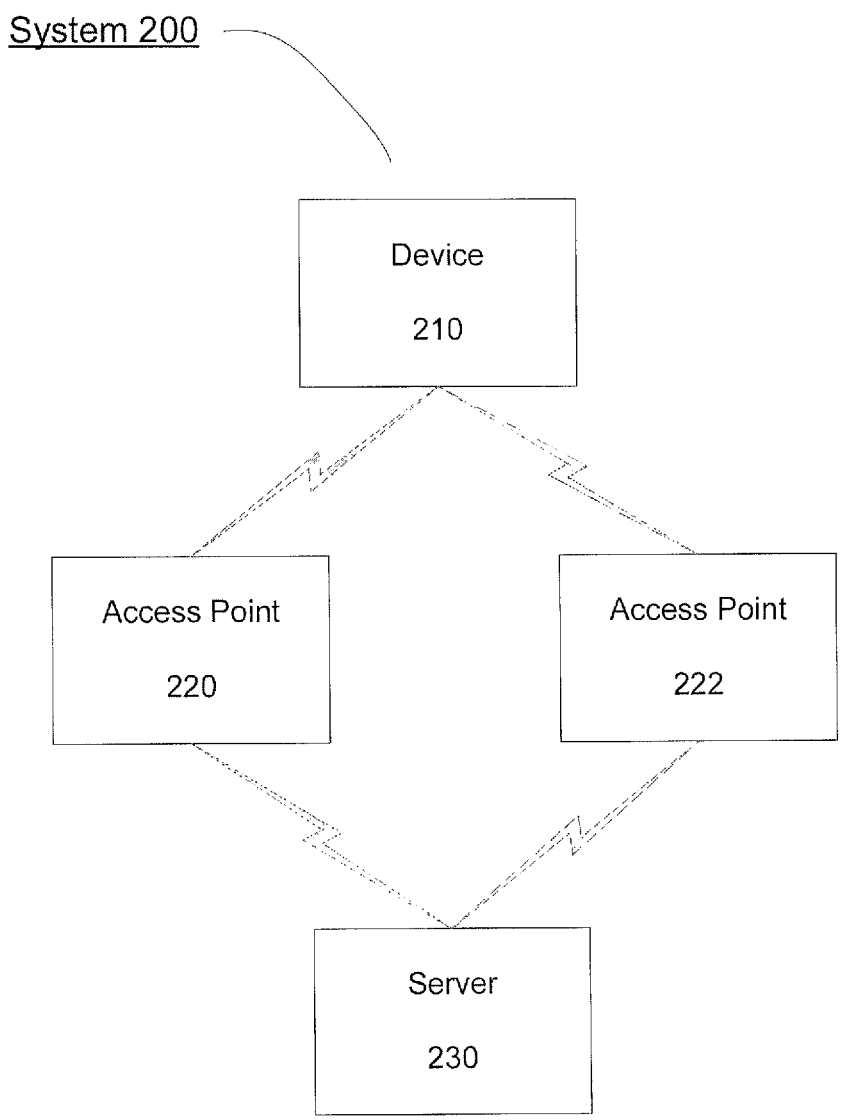
FIG. 2 shows a schematic view of a system for generating synthetic location information according to an exemplary embodiment.

FIG. 2 schematically illustrates a system 200 according to an exemplary embodiment. The system 200 includes a mobile device 210, for which high-accuracy synthetic location information is to be determined according to an exemplary method that will be described in further detail below. The mobile device 210 may be a mobile phone, a smart phone, a tablet, or any other type of mobile computing device that may have its location determined by a low-accuracy mechanism that may result in a desire to generate higher-accuracy location information.

The system 200 also includes access points 220 and 222, which may be cell towers, base stations, wireless local area network access points, or any other type of access points with which the device 210 may communicate in a manner that results in the generation of location data for the device 210 based on a fixed location of the access point 220 or 222. The access point 220 or 222 may have a communication range based on factors such as its transmission power, type of communication, protocol used, the environment in which the access point 220 or 222 is operating, etc. When the device 210 communicates with the access point 220 or 222, the location of the device 210 may then be identified as being within the communication range of the access point 220 or 222. In the exemplary environment illustrated in FIG. 1, which will be discussed with reference to the exemplary method of FIG. 3, the access point 220 may be located at center point 122 and may have a large communication range as indicated by the size of the circle 121, and the access point 222 may be located at center point 132 and may have a medium communication range as indicated by the size of the circle 131. It will be understood by those of skill in the art that the inclusion of two access points 220 and 222 is only exemplary and that the device 210 may communicate with, and have its location determined by association with, further access points in other implementations.

The system 200 also includes a server 230 receiving location data from the device 210 (e.g., via the access points 220 or 222 or via other access points not shown in FIG. 2). The server 230 may include computing hardware elements commonly known in the art, such as a memory, a processor, and a user interface, and may be maintained by, for example, a telecommunications provider providing services to the user of device 210. The server 230 may include a software program stored in a non-transitory memory and executed by a processor to perform the method of FIG. 3, as well as a memory (either the same memory storing the software program or a separate memory) for storing the results thereof. The server 230 may be communicatively coupled with the access points 220 or 222 via a data network, such as the Internet.

Figure 3:
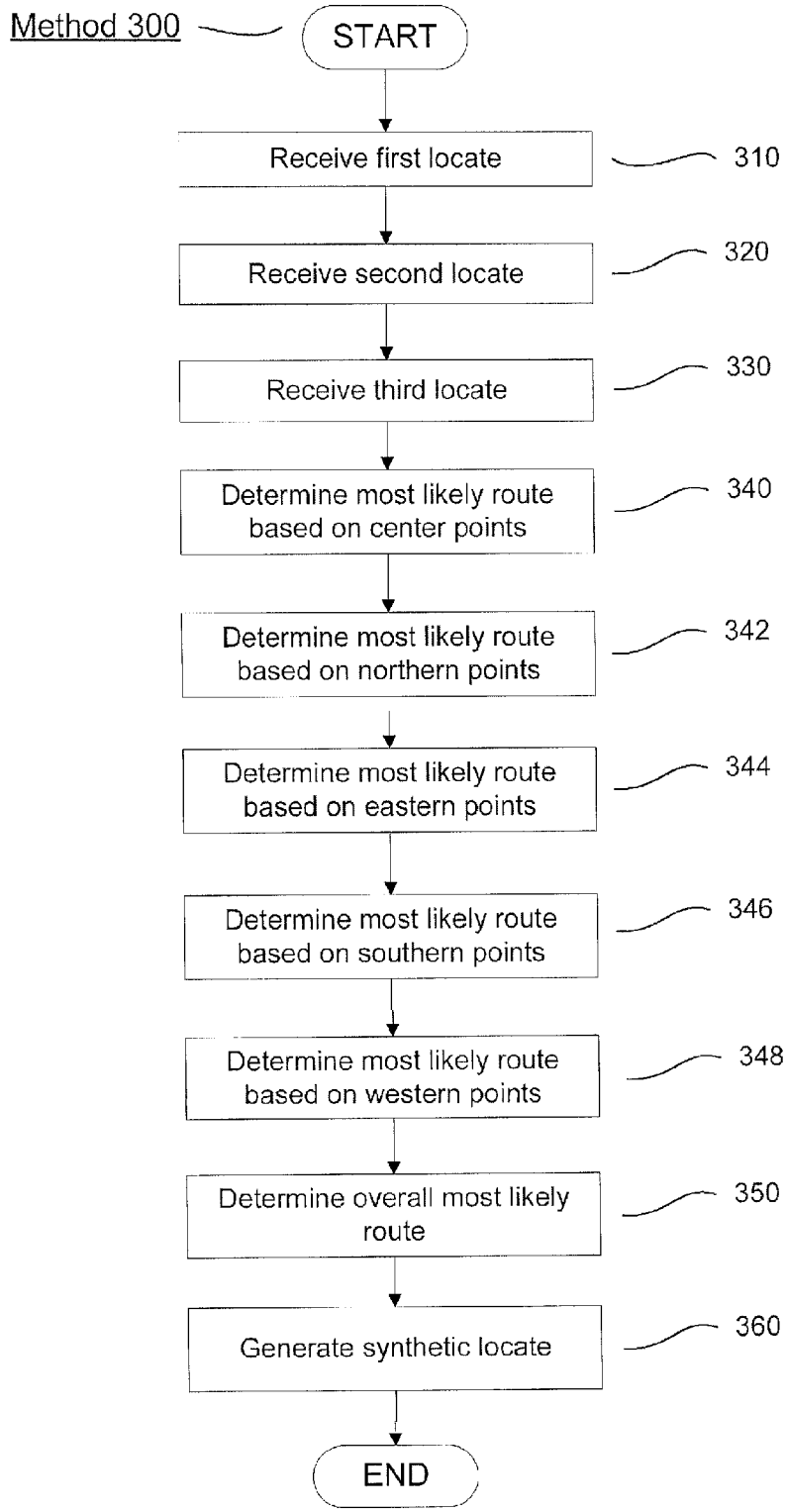
FIG. 3 shows an exemplary method for generating synthetic location information.

FIG. 3 illustrates an exemplary method 300 for generating high-accuracy synthetic location information. The method 300 will be described with reference to the map 100 shown in FIG. 1 and the exemplary system 200 of FIG. 2, but those of skill in the art will understand that this is only exemplary. Further, the method 300 will be described with reference to the generation of synthetic location information based on three input locations, but it will be apparent to those of skill in the art that the broader principles of the exemplary method may be equally applicable to the consideration of as few as two input locations, with no upper limit on the number that may be considered.

In step 310, the server 230 receives a first locate 110 for the device 210. The first locate 110 has a corresponding first time, though the server 230 may receive the first locate 110 at a subsequent point in time. As discussed above, the first locate 110 is a high-accuracy locate, which may be, for example, generated by a GPS receiver that is part of device 210. In an exemplary embodiment where the device 210 has its location determined by an integrated GPS receiver, the location may be transmitted to the server 230 as part of a subsequent communication with the server 230 via a data network such as the Internet.

In step 320, the server 230 receives a second locate 120 for the device 210. The second locate 120 has a corresponding second time, though the server 230 may receive the second locate 120 at a subsequent point in time. As discussed above, the second locate 120 is a low-accuracy locate. The low-accuracy locate 120 may be, for example, generated as a result of the device 210 communicating with the access point 220, which may be, for example, a cell tower having a large radius of communication. In this example, the access point 220 may be maintained by a telecommunications provider providing service to the user of the device 210, which may also be the operator of the server 230. In such an example, the access point 220 may transmit the locate 120 to the server 230 via a data network such as the Internet.

In step 330, the server 230 receives a third locate 130 for the device 210. The third locate 130 has a corresponding third time, though the server 230 may receive the third locate 130 at a subsequent point in time. As discussed above, the third locate 130 is a medium-accuracy locate. The medium-accuracy locate 130 may be, for example, generated as a result of the device 210 communicating with the access point 222, which may be, for example, a wireless local area network access point having a medium range of communication. In this example, the access point 222 may be maintained by a telecommunications provider providing service to the user of the device 210, which may also be the operator of the server 230. In such an example, the access point 222 may transmit the locate 120 to the server 230 via a data network such as the Internet. In another embodiment, the access point 222 may be operated by the user of the device 210 (e.g., a home wireless network), or by a third party (e.g., a wireless network in a public location); in either case, the locate 130 may still be transmitted to the server 230 via a data network such as the Internet, for example by a software program executed by the device 210.

In steps 340-350, the server 230 determines a most likely route taken by the device from the first locate 110, through the second locate 120, and subsequently to the third locate 130. It will be apparent to those of skill in the art that the ordering is based on the timestamps of the locates, and not based on their locations. In the exemplary method 300, this may be accomplished through the use of publicly available mapping tools, but it will be apparent to those of skill in the art that other techniques, such as the use of proprietary tools, may also be possible without departing from the general principles of the exemplary embodiments. Additionally, though the exemplary method 300 makes use of an identification of routes for five different sets of points, as will be described in further detail below, other numbers of sets of points may alternately be used, including simply using one set of points.

In step 340, the server 230 determines a route based on the center points of the three locates 110, 120 and 130. This may involve using a solution method, such as a commercially available mapping tool, to determine a most likely route traveled by device 210 from center point 112 to center point 122 and then to center point 132 based on the amount of time that elapsed between the three locates 110, 120 and 130. In this example, the time elapsed may indicate that the device 210 traveled entirely along road 140, and more specifically along segments 141, 142, 143 and 144. It will be apparent those of skill in the art that, for a different time elapsed, other routes may be identified.

In step 342, the server 230 determines a route based on the northernmost points of the three locates 110, 120 and 130. This may involve using the same solution method used in step 140 to determine a most likely route traveled by device 210 if, instead of traveling along center points 112, 122 and 132, it traveled from point 114 to point 124 and subsequently to point 134. In this example, the time elapsed may indicate that the device 210 traveled along segment 192 of road 190, segment 162 of road 160, and segments 142, 143 and 144 of road 140. As above, it will be apparent those of skill in the art that, for a different time elapsed, other routes may be identified. In an alternative embodiment, the segments may not be used, and the server may simply determine that the device 210 traveled along road 140.

In step 344, the server 230 determines a route based on the easternmost points of the three locates 110, 120 and 130, i.e., from point 115 to point 125 and subsequently to point 135. In this example, the time elapsed may indicate that the device 210 traveled along segment 162 of road 160, segments 142 and 143 of road 140, segment 181 of road 180, segment 144 of road 140, and segment 166 of road 160. As above, it will be apparent those of skill in the art that, for a different time elapsed, other routes may be identified. In an alternative embodiment, the segments may not be used, and the server may simply determine that the device 210 traveled along road 140.

In step 346, the server 230 determines a route based on the southernmost points of the three locates 110, 120 and 130, i.e., from point 116 to point 126 and subsequently to point 136. In this example, the time elapsed may indicate that the device 210 traveled along segment 141 of road 140, segments 163, 164 and 165 of road 160, and segment 145 of road 140. As above, it will be apparent those of skill in the art that, for a different time elapsed, other routes may be identified. In an alternative embodiment, the segments may not be used, and the server may simply determine that the device 210 traveled along road 160.

In step 348, the server 230 determines a route based on the westernmost points of the three locates 110, 120 and 130, i.e., from point 117 to point 127 and subsequently to point 137. In this example, the time elapsed may indicate that the device 210 traveled along segment 151 of road 150 and segments 164 and 165 of road 160. As above, it will be apparent those of skill in the art that, for a different time elapsed, other routes may be identified. In an alternative embodiment, the segments may not be used, and the server may simply determine that the device 210 traveled along road 160.

As noted above, it will be apparent to those of skill in the art that the particular points and point sets used above is only exemplary. In an alternative embodiment, only the center points may be used. In another embodiment, the points used may be the center point and points at the northeast, southeast, southwest and northwest edges of the circles. In another alternative embodiment, a larger number of points may be used, such as the center point plus points at the north, northeast, east, southeast, south, southwest, west and northwest edges of the circles. Alternately, the method may consider points within, rather than on the edge of, the circles, such as a set of points on the circle indicating the periphery of the communication range shown and a further set of points on a smaller concentric circle, such as a circle having half the radius of the outer circle. Further, rather than exclusively considering sets of like points (e.g., center-center, north-north, etc.), each point could be combined with each other point (e.g., center-center, center-north, center-east, center-south, center-west, north-center, north-north . . . , etc.) to provide for the consideration of additional possibilities. It will be apparent to those of skill in the art that an implementation considering a greater number of points and/or a greater variety of point sets may yield higher-probability results, while an implementation considering a smaller number of points and/or a smaller variety of point sets may place less of a burden on the computing resources used to perform the method 300, and that these parameters may therefore be varied, such as by an operator of the server 230, as desired.

In step 350, the server 230 determines a most likely overall route for the device 210 from the first locate 110 through the second locate 120 and to the third locate 130 based on an aggregation of the determinations made in steps 340-348, together with a probability that the device 210 traveled along the most likely route. In one embodiment, the server 230 may simply consider the roads shown on the map 100 as indivisible wholes. In such an embodiment, the server 230 may determine that, for three of the sets of points (points 112, 122 and 132 considered in step 340; points 114, 124 and 134 considered in step 342; points 115, 125 and 135 considered in step 344), the device 210 was determined to have traveled along road 140, while for two of the sets of points (points 116, 126 and 136 considered in step 346; points 117, 127 and 137 considered in step 348) the device 210 was determined to have traveled along road 160. On this basis, the server 230 may determine that the device 210 is most likely to have traveled along road 140, because road 140 was identified the most times as having been the most likely road. The server 230 may further determine that the probability that road 140 was taken by the user of device 210 is 60%, because road 140 was identified for three of the five sets of points (i.e., 60% of the sets of points) under consideration.

In an alternative embodiment in which the server 230 considers the road segments in greater detail, the occurrences of each segment may be counted by the 230, and the likelihood that the device 210 traveled along each segment may be calculated as the number of occurrences of the segment divided by the total number of point groups evaluated. For example, using the point groups discussed above, it may be determined that segment 144 of road 140 is traveled for three of the five point groups under consideration (i.e., from point 112 through point 122 to point 132, from point 114 through point 124 to point 134, and from point 115 through point 125 and to point 135). On this basis, it may be determined that there is a 60% probability that the device 210 traveled along segment 144. Similarly, using the same point groups discussed above, it may be determined that segment 165 of road 160 is traveled for two of the five point groups under consideration (i.e., from point 116 through point 126 to point 136 and from point 118 through point 128 and to point 138), yielding a 40% probability that the device 210 traveled along segment 165, while it may be determined that the segment 166 is traveled for one of the five point groups under consideration (i.e., from point 115 through point 125 to point 135), yielding a 20% probability that the device 210 traveled along segment 166. Therefore, it may be apparent that an approach based on segments, rather than on roads as a whole, may enable the server 230 to provide more specific results as to the locations of the device 210.

In step 360, the server generates a synthetic locate for the device 210; as noted above, a synthetic locate may comprise a location as well as a time for the location. The synthetic locate may be along a road identified in step 350 as a road along which the device 210 traveled (or, in an embodiment that considered the road segments individually, along a segment along which the device 210 traveled). It will be apparent to those of skill in the art that, preferably, the synthetic locate may be along a road or segment that was identified as having the highest probability that device 210 traveled along it, as locates that have a higher probability of being correct will have a correspondingly higher value; however, in some cases (e.g., if there are a number of possible routes with no route having a particularly high probability), the point may be along a road or segment that does not have the highest probability.

The locate may be generated using standard interpolation techniques. For example, if a first locate is at 12:00 pm at a first point, and a second locate is at 1:00 pm at a second point 30 miles away from the first point, and the synthetic locate is being generated along a road running directly from the first point to the second point, then the synthetic locate may have a time of 12:30 pm (e.g., halfway between the time of the first locate and the second locate) and a location 15 miles along the road from the first point to the second point (e.g., halfway between the location of the first locate and the location of the second locate). It will be apparent to those of skill in the art that a synthetic locate being disposed halfway between two recorded locates is only exemplary and that synthetic locates may be disposed at any point along a route between recorded locates.

Following step 360, the method terminates. It will be apparent to those of skill in the art that, though the above description of step 360 of the exemplary method 300 includes the generation of one synthetic locate, an actual implementation may involve the generation of a larger quantity of synthetic locates. It will be further apparent to those of skill in the art that the method 300 may be concurrently or consecutively performed by the same server 230 for multiple instances of the device 210, each of which may be operated by a different user, in order to generate location data for multiple users.

Therefore, the exemplary embodiments described above may enable an entity such as a telecommunications provider, that may receive infrequent low-accuracy locates from one or more of its users, to generate synthetic high-accuracy locates that may be interposed between the recorded low-accuracy locates. Any desired number of synthetic locates may be generated, and the exemplary method may be repeated for any desired quantity of users. The synthetic locates provided by the exemplary embodiments may have corresponding probabilities of correctness; it will be apparent to those of skill in the art that a synthetic locate having a high probability of being correct may have a higher value than a synthetic locate having a low probability of being correct. The synthetic locates may be of interest for use in the delivery of location-based targeted advertising. For example, if a given user has a same (or similar) synthetic locate at a same (or similar) time each day, targeted advertising may be delivered to the user at the time for a business near the synthetic locate.

Those of skill in the art will understand that the above-described exemplary embodiments may be implemented in any number of matters, including as a software module, as a combination of hardware and software, etc. For example, the exemplary method 300 may be embodied in a program stored in a non-transitory storage medium and containing lines of code that, when compiled, may be executed by a processor.

It will be apparent to those skilled in the art that various modifications may be made to the exemplary embodiments, without departing from the spirit or the scope of the invention. Thus, it is intended that the present invention cover modifications and variations of this invention provided they come within the scope of the appended claims and their equivalents.

What is claimed is:

1. A method to accurately determine a synthetic location for a mobile device to initiate a service while minimizing battery consumption, the method comprising:

receiving, by a server, a first location for the mobile device at a first time, wherein the first location is generated by one of a cell tower, a wireless access point and a GPS receiver;

receiving, by the server, a second location for the mobile device at a second time, wherein the second location is generated by one of a second cell tower and a second wireless access point;

determining, by the server, a likely route for the mobile device based on the first location, the second location, and a time interval between the first time and the second time, wherein the likely route is determined by:

determining, by the server, a plurality of routes, each of the plurality of routes connecting one of a plurality of points corresponding to the first location to a corresponding one of a plurality of points corresponding to the second location;

selecting, by the server, a most frequently occurring route of the plurality of routes as the likely route;

generating, by the server, the synthetic location for the mobile device based on the likely route at a corresponding synthetic time between the first time and the second time; and Initiating, by the server, the service for the mobile device based on the synthetic location.

2. The method of claim 1, wherein the plurality of points corresponding to the first location comprises one of a center of an area corresponding to the first location, a point on a perimeter of an area corresponding to the first location, and a point within an area corresponding to the first location.

3. The method of claim 2, wherein the plurality of points corresponding to the first location comprises a center of an area corresponding to the first location, a northernmost point of the area, an easternmost point of the area, a southernmost point of the area, and a westernmost point of the area.

4. The method of claim 1, wherein the likely route comprises a probability of correctness.

5. The method of claim 4, wherein the probability of correctness comprises a quantity of the most frequently occurring route divided by a quantity of the plurality of routes.

6. The method of claim 1, wherein the likely route comprises a likely segment.

7. The method of claim 6, wherein each of the plurality of routes comprises a plurality of segments, and wherein the likely segment is determined by:

selecting a most frequently occurring segment of the plurality of routes as the likely segment.

8. The method of claim 6, wherein the synthetic location is disposed along the likely segment.

9. A system to accurately determine a synthetic locate for a mobile device to initiate a service while minimizing battery consumption, the system comprising:

a first access point in a first location, the first access point communicating with the mobile device at a first time, wherein the first access point comprises one of a cell tower and a wireless access point;

a second access point in a second location, the second access point communicating with the mobile device at a second time, wherein the second access point comprises one of a second cell tower and a second wireless access point; and a server comprising a memory storing a set of instructions and a processor executing the set of instructions to perform operations comprising:

receiving, by the server, a first locate from the first access point, the first locate corresponding to the first location and the first time;

receiving, by the server, a second locate from the second access point, the second locate corresponding to the second location and the second time;

determining, by the server, a likely route for the mobile device based on the first location, the second location, and a time interval between the first time and the second time, wherein the likely route is determined by:

determining, by the server, a plurality of routes, each of the plurality of routes connecting one of a plurality of points corresponding to the first locate to a corresponding one of a plurality of points corresponding to the second locate;

selecting, by the server, a most frequently occurring route of the plurality of routes as the likely route;

generating, by the server, the synthetic locate for the mobile device based on the likely route at a corresponding synthetic time between the first time and the second time; and initiating, by the server, the service for the mobile device based on the synthetic locate.

10. The system of claim 9, wherein the plurality of points corresponding to the first locate comprises one of a center of an area corresponding to the first locate, a point on a perimeter of an area corresponding to the first locate, and a point within an area corresponding to the first locate.

11. The system of claim 10, wherein the plurality of points corresponding to the first locate comprises a center of an area corresponding to the first locate, a northernmost point of the area, an easternmost point of the area, a southernmost point of the area, and a westernmost point of the area.

12. The system of claim 9, wherein the likely route comprises a probability of correctness.

13. The system of claim 12, wherein the probability of correctness comprises a quantity of the most frequently occurring route divided by a quantity of the plurality of routes.

14. The system of claim 9, wherein the likely route comprises a likely segment.

15. The system of claim 14, wherein each of the plurality of routes comprises a plurality of segments, and wherein the processor determines the likely segment by:

selecting a most frequently occurring segment of the plurality of routes as the likely segment.

16. The system of claim 14, wherein the synthetic locate is disposed along the likely segment.

17. A non-transitory computer-readable storage medium including a set of instructions executable by a processor, the set of instructions, when executed by the processor, causing the processor to perform operations to accurately determine a synthetic locate for a mobile device to initiate a service while minimizing battery consumption, comprising:

receiving, by a server, a first location for the mobile device at a first time, wherein the first location is generated by one of a cell tower, a wireless access point and a GPS receiver;

receiving, by the server, a second location for the mobile device at a second time, wherein the second location is generated by one of a second cell tower and a second wireless access point;

determining, by the server, a likely route for the mobile device based on the first location, the second location, and a time interval between the first time and the second time, wherein the likely route is determined by:

determining a plurality of routes, each of the plurality of routes connecting one of a plurality of points corresponding to the first location to a corresponding one of a plurality of points corresponding to the second location;

selecting, by the server, a most frequently occurring route of the plurality of routes as the likely route;

generating, by the server, the synthetic location for the mobile device based on the likely route at a corresponding synthetic time between the first time and the second time; and initiating, by the server, the service for the mobile device based on the synthetic location.

* * * * *